US011605301B2

United States Patent
Manberg

(10) Patent No.: US 11,605,301 B2
(45) Date of Patent: Mar. 14, 2023

(54) SYSTEMS AND METHODS FOR PROVIDING AN ADS-B IN TRAFFIC DISPLAY TABLET REPEATER SYSTEM FOR RETROFIT AIRCRAFT

(71) Applicant: AVIATION COMMUNICATION & SURVEILLANCE SYSTEMS, LLC, Phoenix, AZ (US)

(72) Inventor: Charles Castel Manberg, Phoenix, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 260 days.

(21) Appl. No.: 16/270,313

(22) Filed: Feb. 7, 2019

(65) Prior Publication Data
US 2019/0244529 A1    Aug. 8, 2019

Related U.S. Application Data

(60) Provisional application No. 62/627,393, filed on Feb. 7, 2018.

(51) Int. Cl.
*G08G 5/00* (2006.01)
*B64D 43/00* (2006.01)
(Continued)

(52) U.S. Cl.
CPC .......... *G08G 5/0021* (2013.01); *B64D 43/00* (2013.01); *G01C 23/005* (2013.01); *G06F 3/147* (2013.01);
(Continued)

(58) Field of Classification Search
CPC .............. G08G 5/0021; G08G 5/0052; G08G 5/0004; G08G 5/0078; G06F 3/1454;
(Continued)

(56) References Cited

U.S. PATENT DOCUMENTS

| | | | |
|---|---|---|---|
| 10,163,185 B1 * | 12/2018 | Yarker | G09G 5/363 |
| 2016/0063869 A1 * | 3/2016 | Kathirvel | G08G 5/0043 |
| | | | 701/3 |
| 2016/0180715 A1 * | 6/2016 | Burke | G08G 5/0013 |
| | | | 701/467 |

(Continued)

FOREIGN PATENT DOCUMENTS

| | | | | |
|---|---|---|---|---|
| EP | 2991057 A2 * | 3/2016 | | G08G 5/0008 |
| WO | 2015168320 | 11/2015 | | |

OTHER PUBLICATIONS

R. N. Akram and K. Markantonakis, ("Challenges of security and trust of mobile devices as digital avionics component," 2016 Integrated Communications Navigation and Surveillance (ICNS), 2016, pp. 1C4-1-1C4-11, doi: 10.1109/ICNSURV.2016.7486323).*
Traffic Computer TCAS and ADS-B Functionality, ARINC Characteristic 735B-1 published by Aeronautical Radio, Inc. on (Year: Jun. 12, 2012).*
(Continued)

*Primary Examiner* — Rodney A Butler
(74) *Attorney, Agent, or Firm* — Dickinson Wright PLLC

(57) ABSTRACT

Various avionics systems may benefit from repeaters. For example, an ADS-B In traffic display repeater system may be useful for, for example, retrofit aircraft. A system, according to certain embodiments, can include a traffic awareness computer of an aircraft. The system can also include an aircraft interface device. The system can further include a data bus configured to convey data from the traffic awareness computer to the aircraft interface device. The data conveyed can be configured to permit repetition of one or more displays of a cockpit of the aircraft on a tablet computer.

12 Claims, 3 Drawing Sheets

(51) Int. Cl.
  *G06F 3/14* (2006.01)
  *G06F 3/147* (2006.01)
  *G01C 23/00* (2006.01)

(52) U.S. Cl.
  CPC ......... *G06F 3/1454* (2013.01); *G08G 5/0004* (2013.01); *G08G 5/0052* (2013.01); *G08G 5/0078* (2013.01); *G09G 2380/10* (2013.01)

(58) Field of Classification Search
  CPC ....... G06F 3/147; G01C 23/005; B64D 43/00; G09G 2380/10
  USPC ......................................................... 701/120
  See application file for complete search history.

(56) References Cited

U.S. PATENT DOCUMENTS

| | | | |
|---|---|---|---|
| 2016/0200421 A1* | 7/2016 | Morrison | G05D 1/0077 244/17.23 |
| 2017/0242564 A1* | 8/2017 | De Bossoreille | G06F 3/1454 |
| 2017/0251501 A1* | 8/2017 | Batsakes | B64D 43/00 |
| 2019/0164437 A1* | 5/2019 | K | G08G 5/0013 |
| 2019/0180530 A1* | 6/2019 | True | B64D 43/00 |

OTHER PUBLICATIONS

Notification of Transmittal of the International Search Report and the Written Opinion of the International Searching Authority, or the Declaration, dated Apr. 12, 2019, by the European Patent Office / International Searching Authority, on related international patent application PCT/US2019/017092.

* cited by examiner

SYSTEMS AND METHODS FOR PROVIDING AN ADS-B IN TRAFFIC DISPLAY TABLET REPEATER SYSTEM FOR RETROFIT AIRCRAFT

CROSS-REFERENCE TO RELATED APPLICATION

This application is a non-provisional of, and claims the benefit and priority of, U.S. Provisional Patent Application No. 62/627,393, filed Feb. 7, 2018, the entirety of which is hereby incorporated herein by reference.

BACKGROUND

Field

Various avionics systems may benefit from repeaters. For example, an ADS-B In traffic information display repeater system may be useful for, for example, retrofit aircraft.

Related Art

Today, automatic dependent surveillance-broadcast (ADS-B) In information is presented to the pilot on a display in the flight deck known as a Cockpit Display of Traffic Information, or CDTI. The CDTI provides the display of traffic information to the pilot for basic traffic situational awareness and additional information from ADS-B In applications, such as CDTI Assisted Visual Separation (CAVS), In-Trail Procedures (ITP), and Flight Deck Interval Management (FIM). ADS-B In can involve receiving flight information system broadcast (FIS-B), traffic information system broadcast (TIS-B) and other ADS-B data, for example from other aircraft.

The CDTI typically has been hosted on a Class 3 Electronic Flight Bag (EFB) for retrofit aircraft as a display platform to meet Federal Aviation Administration (FAA) certification requirements. The Class 3 EFB is becoming obsolete and the platform to host the CDTI is no longer available.

SUMMARY

A system, according to certain embodiments, can include a traffic awareness computer of an aircraft. The system can also include an aircraft interface device (AID). The system can further include a data bus configured to convey data from the traffic awareness computer to the aircraft interface device. The data conveyed can be configured to permit repetition of one or more aircraft cockpit displays on a tablet computer.

BRIEF DESCRIPTION OF THE DRAWINGS

The accompanying drawings are provided for purposes of illustration and not by way of limitation.

DETAILED DESCRIPTION

Certain embodiments provide for the use of commercially available tablet computers, such as Apple iPad, Microsoft Surface Pro, or the like, to host EFB applications. For example, CDTI and ADS-B application information can be hosted on these commercially available tables in the flight deck. Nevertheless, the FAA certification requirements for providing the CDTI requirements on the tablet as the sole source of information in the flight deck are prohibitive since the tablet is not FAA certified equipment.

Embodiments of the present invention may provide systems and methods for incorporating a CDTI displaying both airborne and ground traffic on a commercial tablet as a repeater of traffic information in the cockpit. The tablet CDTI may repeat ADS-B In traffic information found on a Navigation Traffic Collision and Avoidance System (TCAS) Display, graphical ADS-B Guidance Display (AGD), and Multi-purpose Control Display Unit (MCDU), as described in U.S. Provisional Patent Application No. 62/438,680, filed on Dec. 23, 2016, and entitled "Systems and Methods for Providing an ADS-B In Display and Control System," the contents of which are hereby incorporated herein by reference. Additionally hereby incorporated by reference is U.S. patent application Ser. No. 15/854,364, filed Dec. 26, 2017, and entitled "Systems and Methods for Providing an ADS-B In Display and Control System."

The tablet CDTI may provide the flight crew integration of ADS-B traffic data found on multiple displays in the ADS-B In Retrofit Aircraft Display system flight deck, as well as industry standard ADS-B traffic symbology on a single large screen. Incorporating the tablet CDTI for use by flight crews may require ADS-B In Traffic and Application information to be displayed on certified displays, as described in U.S. Provisional Patent Application No. 62/438,680, filed on Dec. 23, 2016, and entitled "Systems and Methods for Providing an ADS-B In Display and Control System," the contents of which are again hereby incorporated herein by reference.

Figure 1:
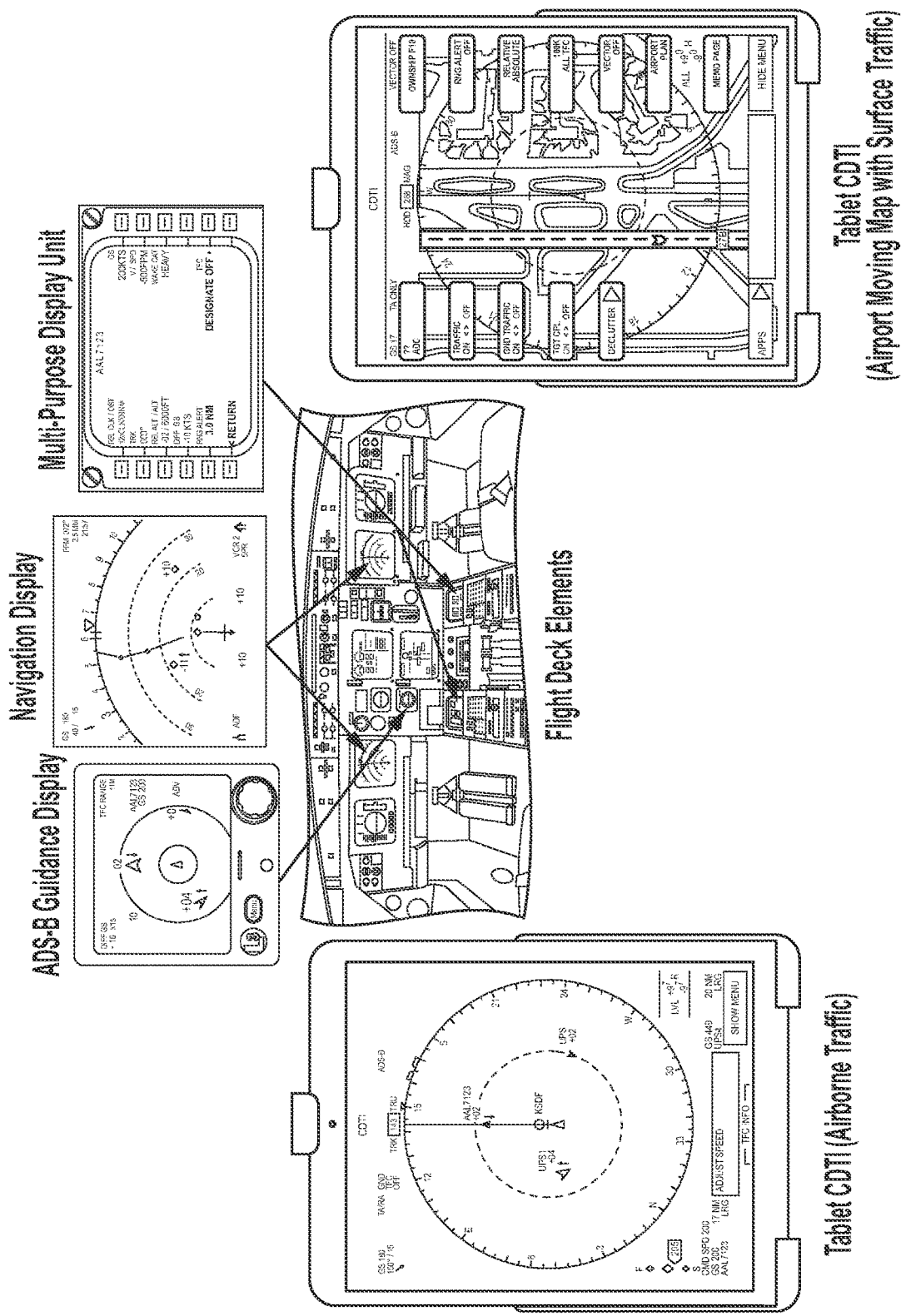
FIG. 1 illustrates an example flight deck architecture of a Tablet CDTI as a repeater of ADS-B In Information.

FIG. 1 illustrates an example flight deck display architecture of a Tablet CDTI as a repeater of ADS-B In Information. The tablet CDTI repeater cockpit system shown in FIG. 1 can include one or more tablets in addition to flight deck elements, such as an ADS-B guidance display system, a navigation display, and a multi-purpose display unit. Although two tablets are shown, a single tablet could be used to display both the airborne traffic (shown at left) and the airport moving map with surface traffic (shown at right).

In a typical use case, a non-flying pilot of an aircraft would us the tablet CDTI. The tablet does not need to be dedicated to serve as a CDTI. For example, the tablet can server other avionics functions or other computing functions, such as web browsing, instant messaging, checklist, or the like.

Figure 2:
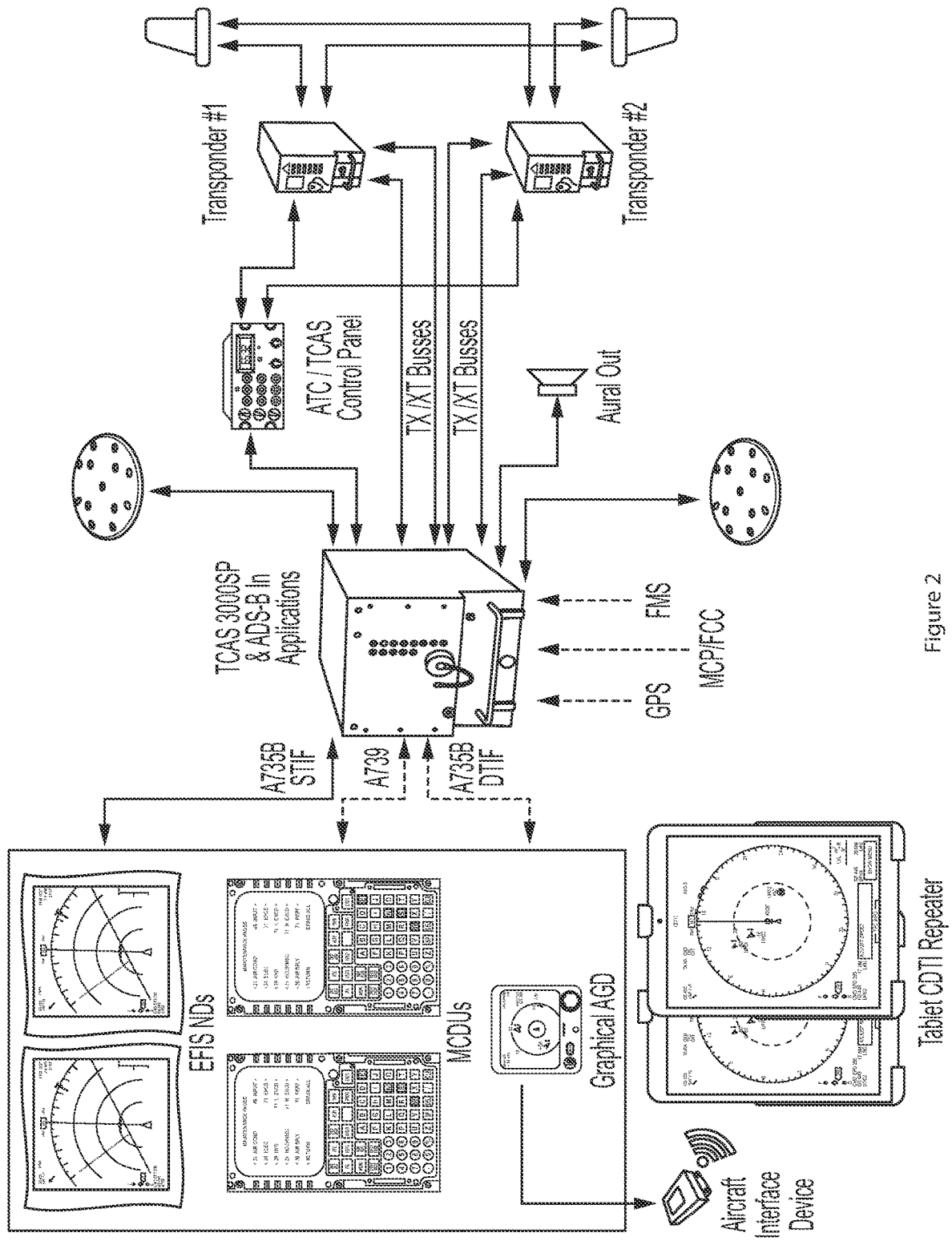
FIG. 2 illustrates an example of an aircraft avionic system diagram of a tablet CDTI repeater.

FIG. 2 illustrates an example of an aircraft avionic system diagram of a tablet CDTI repeater. In the tablet CDTI repeater avionic system diagram of FIG. 2, as shown at right there can be top and bottom antennas connected to transponder #1 and transponder #2. Those transponders can be connected over busses to a TCAS system. There can also be an air traffic control (ATC)/TCAS control panel connected to the TCAS computer and to the transponders.

The TCAS system can have additional antennas shown at top and bottom in the center of FIG. 2. The TCAS system can also receive various inputs including global positioning system (GPS) data, flight management system (FMS) data, and mode control panel (MCP)/flight control computer (FCC) data. The TCAS system may be a TCAS 3000SP, which may be equipped with ADS-B In applications. The TCAS system may be connected to the various displays illustrated in FIG. 1 over interfaces such as A735B STIF, A739, and A7358 DTIF. An aircraft interface device can be provided to connect to one or more tablet CDTI repeaters.

The aircraft interface device is shown as connecting to a cockpit display, but could be connected to the TCAS system via, for example, any TCAS system data bus. The connection is shown as a wireless connection, but could instead be a wired connection.

The tablet CDTI may be configured not to replace, but to augment, repeat, and/or consolidate the information on electronic flight instrument system (EFIS) navigation displays (NDs), MCDUs, and graphical AGDs. Thus, the tablet device can be acting as a repeater, rather than as acting as a substitute.

The tablet CDTI can be used to provide traffic situational awareness for pilots or others interested in the aircraft. As shown in FIG. 1, the tablet CDTI can be used in flight scenarios and also in surface scenarios, such as taxiing and takeoff operations.

The same principles can be used in the context of an autonomous or remotely piloted vehicle. In such a case, there may be a plurality of certified displays for a remote vehicle operator. The tablet CDTI can receive data from the same sources as the certified displays and produce a repeated image. This repeated image may be used by a non-flying pilot, for example to familiarize the pilot with situational awareness before a shift change. Another use case is for use by the supervisor of one or more pilots to check situational awareness. Air traffic controllers can be provided with the same CDTI tablets, which can be programmed to repeat the display shown to the pilots on the tablet CDTI, based on the same information available to the pilot.

Although tablets are used as an example, other kinds of display devices are permitted. For example, laptop computers or similar devices with large portable displays may be used. Thus, for example, the presence of peripheral devices, such as a keyboard, trackball, mouse, or the like, may not disqualify the device from being used in certain embodiments.

Certain embodiments may allow for a larger display to be provided for use in an aircraft, without having to redesign the cockpit and replace certified displays. This may permit a form of retrofitting for aircraft. For example, the retrofitting process may involve installing an aircraft interface device connected to a TCAS system data bus.

Figure 3:
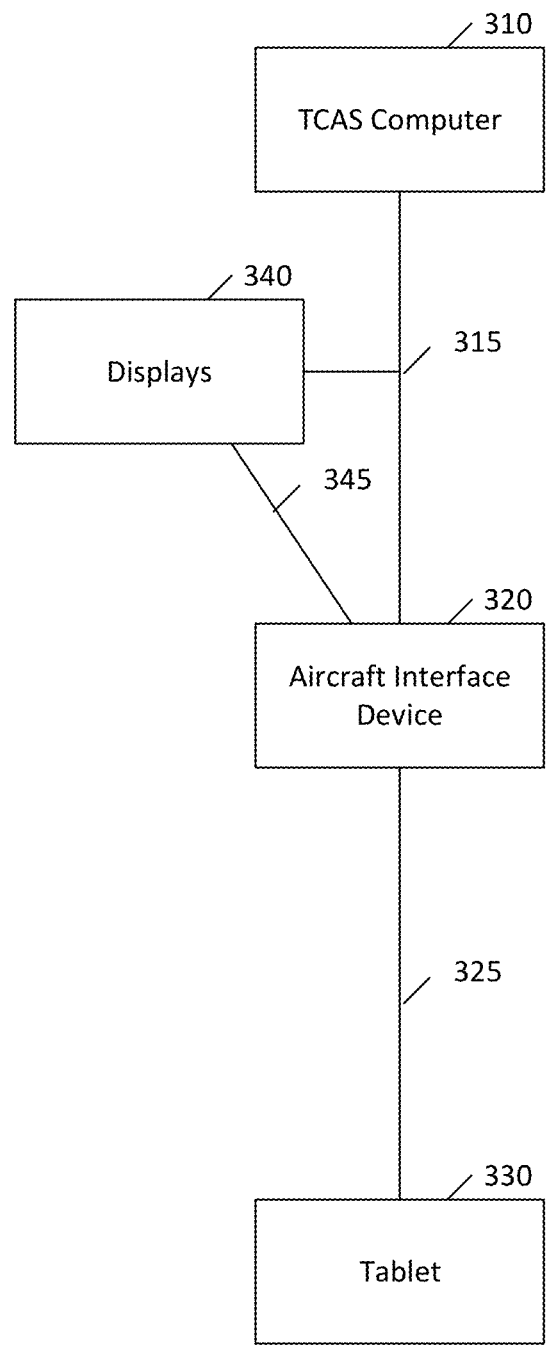
FIG. 3 illustrates a block diagram of a system, according to certain embodiments of the present invention.

FIG. 3 illustrates a block diagram of a system, according to certain embodiments of the present invention. As shown in FIG. 3, a TCAS computer 310 can be provided in an aircraft. The TCAS computer 310 can be any commercially available TCAS system or any substitute for such a system. The TCAS computer 310 can be configured to provide ADS-B In information to an aircraft interface device 320 over a bus 315 or other connection.

The aircraft interface device 320 can be a device that converts data provided over bus 315 into a form that can be communicated to tablet 330 over connection 325. Connection 325 may be a wireless connection. In this case, aircraft interface device 320 can include a wireless network card, antenna, transceiver, and/or other communications hardware to convey data from the aircraft interface device 320 toward the tablet 330 over the connection 325.

The aircraft interface device 320 can be configured to provide authentication with the tablet 330, for example to ensure that only authorized users access the aircraft interface device 320. The aircraft interface device 320 can be configured to receive commands from the tablet 330 over the connection 325.

The commands may be requests for additional data, commands of a communication protocol between the aircraft interface device 320 and the tablet 330, or any other desired commands. In certain embodiments, the tablet 330 can be configured to provide an additional user interface for any of the repeated displays 340. Thus, the connection 325 can carry the user interactions toward the aircraft interface device 320, which can relay these interactions toward the displays 340 over an interface 345, which may be the same bus 315 or another connection. The displays 340 can be any certified display for use in a cockpit.

The tablet 330 can be any computing device with communication capability and display capability. The communication capability can be provided by, for example, one more network interface card, transceiver, antenna, or the like. The display capability can be provided by, for example, a liquid crystal display (LCD), light emitting diode (LED) display, organic LED (OLED) display, or any other suitable display.

What is claimed is:

1. An aircraft system, comprising:
a Traffic Collision and Avoidance System (TCAS) coupled to a top antenna and a bottom antenna of an aircraft;
an aircraft interface device communicatively coupled to:
a tablet computer; and
the TCAS through a data bus configured to convey data from the TCAS to the aircraft interface device, the data bus comprising one of a A735B STIF, A739, and A735B DTIF bus interface, wherein:
the data conveyed is configured to display, on the tablet computer, display information identical to display information provided on one or more displays of a cockpit of the aircraft; and
the aircraft interface device is configured to provide authentication with the tablet computer to ensure that only authorized users access the aircraft interface device.

2. The system of claim 1, wherein the aircraft interface device is configured to transmit the data to the tablet computer.

3. The system of claim 1, wherein the display information corresponds to display information from a Navigation Traffic Collision and Avoidance System (TCAS) Display, a graphical ADS-B Guidance Display (AGD), or a Multipurpose Control Display Unit (MCDU).

4. The system of claim 1, wherein the aircraft interface device is configured to wirelessly transmit the data to the tablet.

5. The system of claim 1, wherein the aircraft interface device is configured to transmit the data to the tablet over a wired connection.

6. The system of claim 1, wherein the aircraft interface device is configured to receive commands from the tablet.

7. The system of claim 1, wherein the aircraft interface device is configured to relay commands from the tablet to the traffic awareness computer.

8. An aircraft system, comprising:
a Traffic Collision and Avoidance System (TCAS) coupled to a top antenna and a bottom antenna of an aircraft;
an aircraft interface device communicatively coupled to:
a tablet computer; and
the TCAS through a data bus configured to convey data from the traffic awareness computer to the aircraft interface device, the data bus comprising one of a A735B STIF, A739, and A735B DTIF bus interface, wherein:

the data conveyed is configured to display, on the tablet computer, display information identical to display information provided on one or more displays of a cockpit of the aircraft; and the tablet computer is configured to display both airborne traffic and an airport moving map with surface traffic.

9. The system of claim 1, wherein the aircraft comprises one of an autonomous vehicle or a remotely piloted vehicle.

10. The system of claim 1, wherein the tablet computer is disposed remote to the aircraft, and the display of the tablet is configured to be viewed by one of a non-flying pilot, a supervisor of one or more pilots, and an air traffic controller.

11. The system of claim 8, wherein the aircraft comprises one of an autonomous vehicle or a remotely piloted vehicle.

12. The system of claim 8, wherein the tablet computer is disposed remote to the aircraft, and the display of the tablet is configured to be viewed by one of a non-flying pilot, a supervisor of one or more pilots, and an air traffic controller.

* * * * *